United States Patent
Lee

(10) Patent No.: US 10,115,954 B2
(45) Date of Patent: Oct. 30, 2018

(54) BATTERY MODULE

(71) Applicant: SAMSUNG SDI CO., LTD., Yongin-si, Gyeonggi-do (KR)

(72) Inventor: Jang-Wook Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 159 days.

(21) Appl. No.: 14/551,597

(22) Filed: Nov. 24, 2014

(65) Prior Publication Data

US 2015/0171405 A1 Jun. 18, 2015

(30) Foreign Application Priority Data

Dec. 17, 2013 (KR) .................. 10-2013-0156832

(51) Int. Cl.
*H01M 2/12* (2006.01)
*H01M 2/24* (2006.01)
(Continued)

(52) U.S. Cl.
CPC .............. *H01M 2/24* (2013.01); *H01M 2/12* (2013.01); *H01M 2/1252* (2013.01); *H01M 2/206* (2013.01); *H01M 2/34* (2013.01); *H01M 10/04* (2013.01); *H01M 2/0217* (2013.01); *H01M 2/1077* (2013.01); *H01M 2/1205* (2013.01);
(Continued)

(58) Field of Classification Search
None
See application file for complete search history.

(56) References Cited

U.S. PATENT DOCUMENTS

2004/0043663 A1* 3/2004 Ikeda .................... H01M 2/206
439/627
2010/0124693 A1* 5/2010 Kosugi .............. G01R 31/3644
429/92
(Continued)

FOREIGN PATENT DOCUMENTS

EP 2461392 A2 6/2012
JP 2006-344572 A 12/2006
(Continued)

OTHER PUBLICATIONS

European Search Report dated Feb. 27, 2015.
(Continued)

*Primary Examiner* — Scott J. Chmielecki
(74) *Attorney, Agent, or Firm* — Lee & Morse P.C.

(57) ABSTRACT

A battery module includes a plurality of battery cells arranged in a first direction, each one of the plurality of battery cells having a terminal portion on an upper surface thereof, a bus-bar holder positioned on the plurality of battery cells, the bus-bar holder having an opening exposing terminal portions of the plurality of battery cells, a bus-bar positioned in the opening of the bus-bar holder, the bus-bar being spaced apart from a circumference of the opening of the bus-bar holder by a predetermined interval, and the bus-bar electrically connecting terminal portions of adjacent battery cells among the plurality of battery cells, a guide portion extending along the opening in the first direction, the guide portion extending upward above the opening, and a fixing member on an inner surface of the guide portion.

16 Claims, 5 Drawing Sheets

(51) Int. Cl.
*H01M 10/04* (2006.01)
*H01M 2/34* (2006.01)
*H01M 2/20* (2006.01)
H01M 2/02 (2006.01)
H01M 2/10 (2006.01)
H01R 11/28 (2006.01)

(52) U.S. Cl.
CPC ....... *H01R 11/288* (2013.01); *Y10T 29/49174* (2015.01); *Y10T 29/49179* (2015.01)

(56) References Cited

U.S. PATENT DOCUMENTS

| | | | | |
|---|---|---|---|---|
| 2011/0076521 A1* | 3/2011 | Shimizu | ............. | H01M 2/1061 429/7 |
| 2011/0097620 A1* | 4/2011 | Kim | .................... | H01M 2/1061 429/161 |
| 2011/0104556 A1 | 5/2011 | Kim et al. | | |
| 2012/0115014 A1 | 5/2012 | Park et al. | | |
| 2013/0130071 A1* | 5/2013 | Adachi | ............... | H01M 10/482 429/53 |
| 2014/0335393 A1* | 11/2014 | Wada | .................. | H01M 2/1077 429/121 |

FOREIGN PATENT DOCUMENTS

| | | |
|---|---|---|
| JP | 2010-97722 A | 4/2010 |
| JP | 2012-084319 A | 4/2012 |
| KR | 10-2011-0044130 A | 4/2011 |

OTHER PUBLICATIONS

European Search Report dated Nov. 2, 2016.
Chinese 1st Office Action issued by the Chinese Patent Office dated Feb. 24, 2018 in the examination of the Chinese Patent Application No. 201410785610.7.

* cited by examiner

BATTERY MODULE

CROSS-REFERENCE TO RELATED APPLICATION

Korean Patent Application No. 10-2013-0156832, filed on Dec. 17, 2013, in the Korean Intellectual Property Office, and entitled: "BATTERY MODULE," is incorporated by reference herein in its entirety.

BACKGROUND

1. Field

An aspect of embodiments relates to a battery module, and more particularly, to a battery module with a plurality of battery cells electrically connected to each other.

2. Description of the Related Art

In general, battery cells are used as energy sources for mobile devices, electric vehicles, hybrid vehicles and the like. The shape of the battery cell is variously changed depending on the kind of external device to which the battery cell is applied.

In a case where long-time driving and high-power driving are required in an electric vehicle or hybrid vehicle which consumes a large amount of power, a large-capacity battery module is configured by electrically connecting a plurality of battery cells in order to increase power and capacity. The output voltage or output current of the battery module may be increased according to the number of battery cells built in the battery module.

SUMMARY

Embodiments provide a battery module with a fixing member on a guide portion of a bus-bar holder, so that a bus-bar can be easily fixed.

Embodiments also provide a battery module with a bus-bar spaced apart from the circumference of an opening of a bus-bar holder at a predetermined interval, so that it is possible to prevent the bus-bar holder from being damaged by heat and to improve the external appearance of a welding bead.

Embodiments also provide a battery module with a gas exhausting portion in a bus-bar holder, so that a shield gas can be smoothly exhausted therethrough when a bus-bar is welded to a terminal portion of a battery cell.

According to an aspect of the embodiments, there is provided a battery module, including a plurality of battery cells arranged in a first direction, each one of the plurality of battery cells having a terminal portion on an upper surface thereof, a bus-bar holder positioned on the plurality of battery cells, the bus-bar holder having an opening exposing terminal portions of the plurality of battery cells, a bus-bar positioned in the opening of the bus-bar holder, the bus-bar being spaced apart from a circumference of the opening of the bus-bar holder by a predetermined interval, and the bus-bar electrically connecting terminal portions of adjacent battery cells among the plurality of battery cells, a guide portion extending along the opening in the first direction, the guide portion extending upward above the opening, and a fixing member on an inner surface of the guide portion.

The fixing member may be formed at a position corresponding to the upper surface of the bus-bar.

The bus-bar may include a bending portion bent to protrude upward, and the fixing member may be formed at a position corresponding to the bending portion.

A portion of the fixing member may overhang an edge of the bending portion of the bus bar.

The fixing member may be formed in the shape of a hook.

The guide portion may be continuously formed along the direction where the plurality of battery cells are arranged.

A plate-shaped insulating member may be formed between adjacent openings of the bus-bar holder, and both sides of the insulating member may be connected to the guide portion.

The insulating member may include a gas exhausting portion in which the height of one area is formed low.

A short circuit preventing member may be formed to protrude upward in one area of the gas exhausting portion.

The gas exhausting portion may be formed higher than the upper surface of the bus-bar.

The bus-bar holder may be made of a plastic compound material.

A portion of the opening may separate the bus-bar from the bus bar holder, the portion of the opening being an empty space.

According to another aspect of the embodiments, there is provided a method of manufacturing a battery module, including arranging a plurality of battery cells in a first direction, each one of the plurality of battery cells having a terminal portion on an upper surface thereof, forming a bus-bar holder on the plurality of battery cells, the bus-bar holder having an opening exposing terminal portions of the plurality of battery cells, forming a bus-bar in the opening of the bus-bar holder, the bus-bar being spaced apart from a circumference of the opening of the bus-bar holder by a predetermined interval, and the bus-bar electrically connecting terminal portions of adjacent battery cells among the plurality of battery cells, forming a guide portion extending along the opening in the first direction, the guide portion extending upward above the opening, and forming a fixing member on an inner surface of the guide portion.

The terminal portion of the battery cell and the bus-bar may be bonded through welding.

The terminal portion of the battery cell and the bus-bar may be bonded through laser welding or ultrasonic welding.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
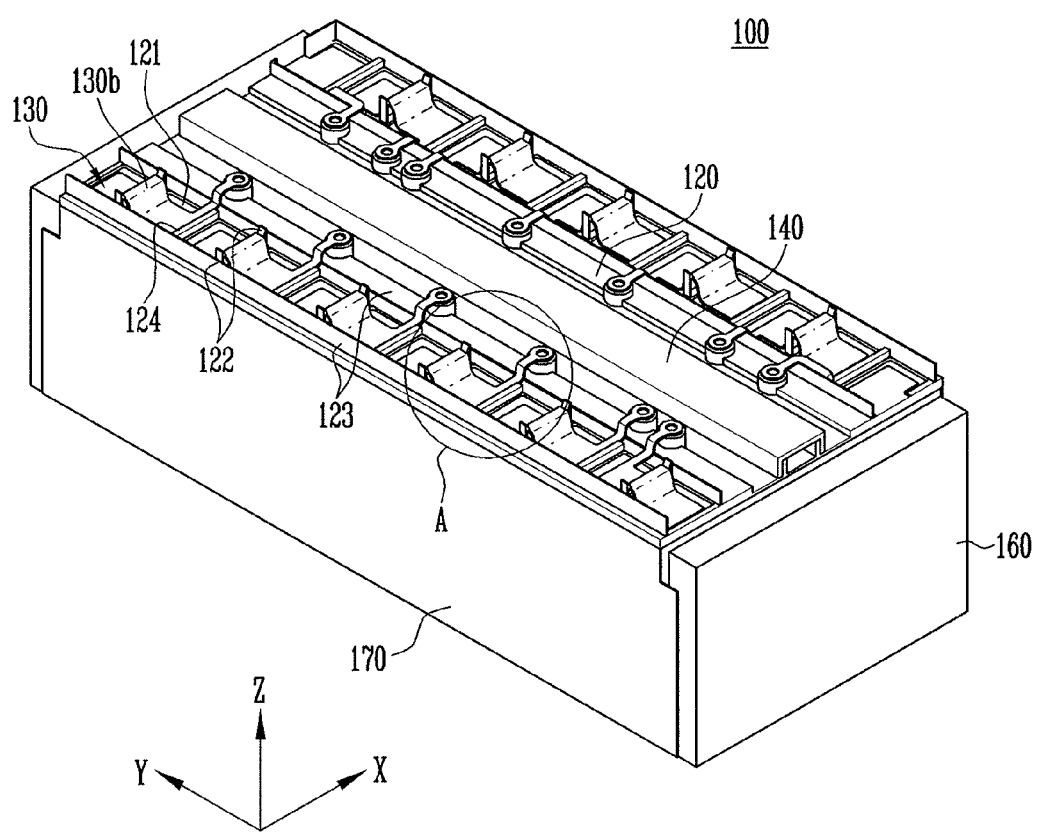
FIG. 1 illustrates a perspective view of a battery module according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, dimensions may be exaggerated for clarity of illustration and are not necessarily drawn to scale. It will also be understood that when an element is referred to as being "between" two elements, it can be the only element between the two elements, or one or more intervening elements may also be present. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements throughout.

Figure 2:
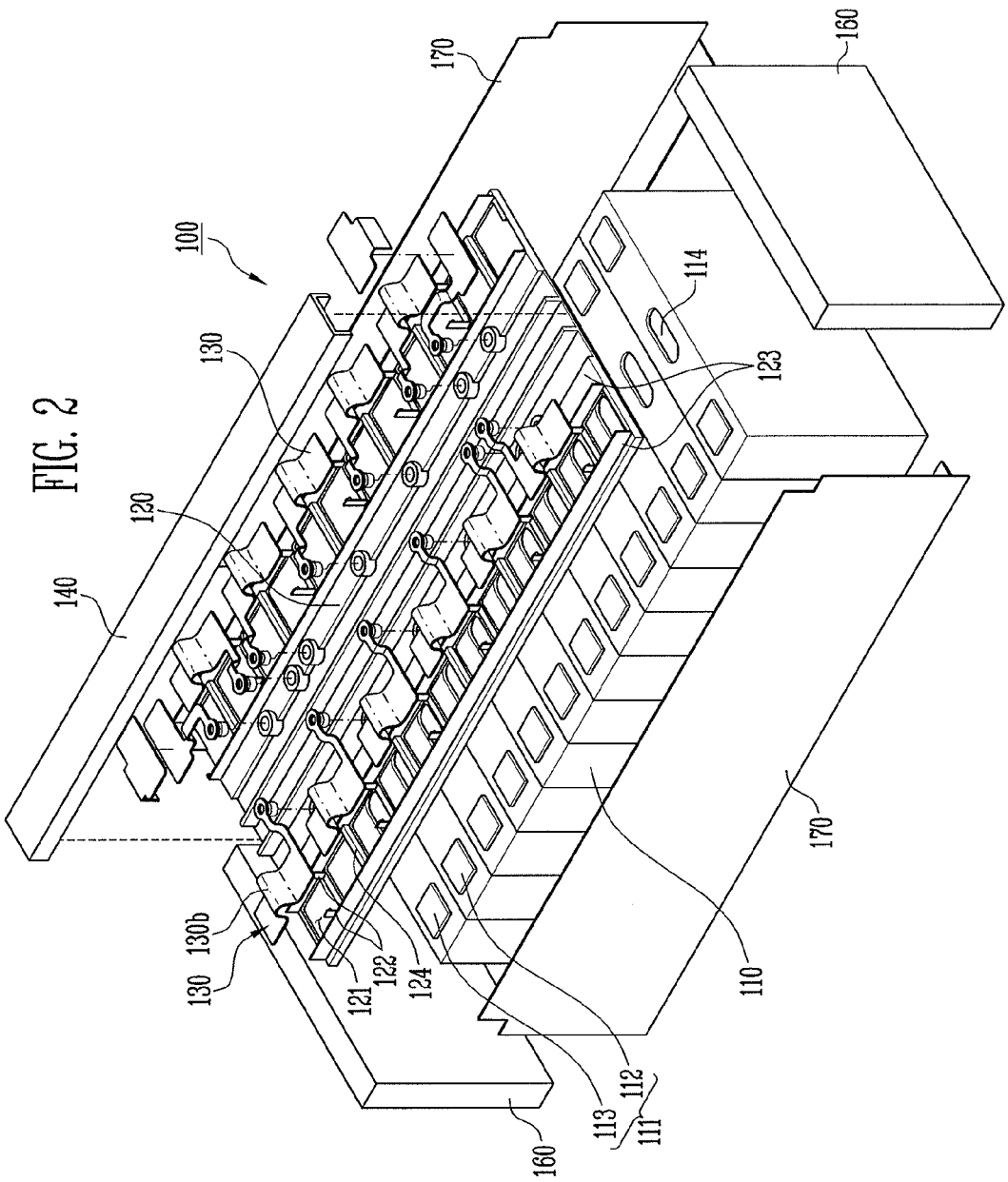
FIG. 2 illustrates an exploded perspective view of the battery module of FIG. 1.

FIG. 1 is a perspective view of a battery module according to an embodiment. FIG. 2 is an exploded perspective view of the battery module of FIG. 1.

Referring to FIGS. 1 and 2, a battery module 100 according to embodiments may include a plurality of battery cells 110, a bus-bar holder 12,0 and bus-bars 130. Here, the plurality of battery cells 110 are arranged in one direction, and each battery cell 110 has a terminal portion 111 formed on an upper surface thereof. The bus-bar holder 120 is positioned on the plurality of battery cells 110, and has an opening 121 through which the terminal portion 111 is exposed. The bus-bar 130 is positioned in the opening 121 of the bus-bar holder 120, and electrically connects between adjacent battery cells 110 among the plurality of battery cells 110.

In this case, the terminal portion 111 of the battery cell 110 and the bus-bar 130 are bonded through welding. For example, the terminal portion 111 of the battery cell 110 and the bus-bar 130 may be bonded to each other through laser welding or ultrasonic welding.

The bus-bar holder 120 may be made of a plastic compound material. Hence, when a conventional bus-bar is welded to a terminal portion of a battery cell, the bus-bar holder around the welding portion is melted by reflected heat, and therefore, a foreign substance is generated. The foreign substance may penetrate into shield gas used to maintain a vacuum state during welding, and therefore, blacking may occur in a welding bead.

Therefore, according to embodiments, the bus-bar 130 is formed to be spaced apart from a circumference, i.e., boundary, of the opening 121 of the bus-bar holder 120 by a predetermined interval. That is, a size, e.g., a width along the x-axis, of the bus-bar 130 may be formed to be smaller than that of the opening 121, e.g., a portion of the opening 121 may separate the bus-bar 130 from the bus-bar holder 120 along the x-axis. As such, a welding portion 132 (see FIG. 3) of the bus-bar 130 and the bus-bar holder 120 may be spaced apart from each other, e.g., the welding portion 132 of the bus-bar 130 and the bus-bar holder 120 may be separated from each other by a portion of the opening 121, so heat transfer from the bus-bar 130 toward the bus-bar holder 120 during welding may be substantially reduced. In other words, it is possible to reduce thermal influence on the bus-bar holder 120 when the bus-bar 130 is welded to the terminal portion 111 of the battery cell 110. Further, the separation between the bus-bar holder 120 and the bus-bar 130 prevents the bus-bar holder 120 from melting, even if the bus-bar holder 120 is made of a plastic material, so that it is possible to improve the external appearance of the welding bead.

A guide portion 123 may be formed to protrude upward along the circumference of the opening 121 and along an alignment direction of the arranged plurality of battery cells 110, e.g., along the y-axis. For example, the guide portion 123 may be continuously formed along the alignment direction of the arranged plurality of battery cells 110, e.g., the guide portion 123 may continuously overlap all battery cells 110 in the battery module 100. For example, as illustrated in FIGS. 1-2, the guide portion 123 may include first and second plate-shaped guide portions 123 facing each other and extending along the y-axis, so the a plurality of the openings 121 may be positioned between the facing first and second guide portions 123, e.g., the plurality of opening may be adjacent to each other along the y-axis to have each opening 121 directly between the first and second guide portions 123 along the x-axis.

Figure 4:
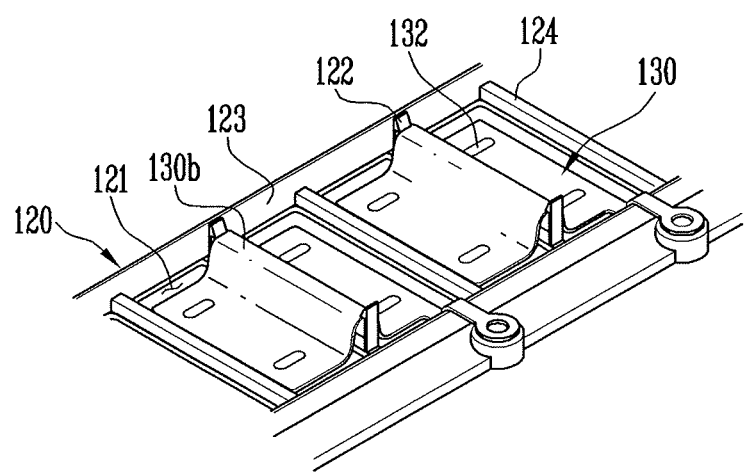
FIG. 4 illustrates a perspective view showing the portion A of FIG. 1.

A fixing member 122 is formed on an inner surface of the guide portion 123, i.e., on a surface of the guide portion 123 facing the opening 121, which faces the bus-bar 130. Here, the fixing member 122 is formed at a position corresponding to the upper surface of the bus-bar 130. The bus-bar 130 includes a bending portion 130b bent to protrude upward, and the fixing member 122 is formed at a position corresponding, e.g., adjacent, to the bending portion 130b. For example, the fixing member 122 may be formed in a shape of a hook facing downward, e.g., the fixing member 122 may include a portion protruding over or overhanging an edge of the opening 121. For example, the fixing member may be positioned to be aligned with the bending portion 130b, such that the protruding portion of the fixing member, i.e., the hook, overhangs an edge of the bending portion 130b (FIG. 4). Accordingly, when being mounted on the terminal portion 111 of the battery cell 110, the bus-bar 130 is easily inserted into the opening 121 of the bus-bar holder 120 by the elasticity of the hook, e.g., by sliding into place via the overhanging portion of the fixing member 122. In addition, interference caused by the hook occurs in the upper direction of the bus-bar 130, e.g., the overhanging portion of the fixing member 122 may prevent movement of the bus-bar 130 out of the opening 121, and thus the bus-bar 130 is fixed in place, i.e., not to be separated upward.

Although it has been described in this embodiment that the fixing member 122 is formed in the shape of a hook, embodiments are not limited thereto. That is, the fixing member 122 may be formed in any suitable shape which enables the bus-bar 130 to be fixed to the terminal portion 111 of the battery cell 110.

The battery module 100 according to this embodiment includes the plurality of battery cells 110 arranged in the one direction. The battery cells 110 are aligned so that wide surfaces of adjacent battery cells 110 face each other. Each battery cell 110 constituting the battery module 100 may include a battery case, of which one surface is opened, and an electrode assembly and an electrolyte, which are accommodated in the battery case. The electrode assembly and the electrolyte generate energy through an electrochemical reaction therebetween, and the battery case may be sealed by a first surface. For example, the first surface of the battery case, i.e., an upper surface of the battery cell 110, may include a cap assembly. The upper surface of the battery cell 110 is provided with terminal portions 111 having different polarities, i.e., positive and negative electrode terminals 112 and 113, and a vent portion 114. The vent portion 114 acts as a passage through which gas generated inside the battery cell 110 is exhausted to the outside of the battery cell 110, thereby increasing safety of the battery cell 110.

A pair of end plates 160 may be respectively provided adjacent to outermost battery cells 110, and a pair of side plates 170 connecting between the pair of end plates 160 may be respectively disposed at sides of the battery cell 110. The plurality of battery cells 110 may be arranged in one direction in a space defined by the pair of end plates 160 and the pair of side plates 170. Further, a gas path 140, through which gas from the vent portions 114 of the plurality of battery cells 110 is extracted, may be provided e.g., the gas path 140 may extend to overlap all the vent portions 117 of the plurality of battery cells 110 in the battery module 100.

In this case, the plurality of battery cells 110 are arranged in parallel so that their wide front surfaces are opposite to one another, and thus the positive and negative electrode terminals 112 and 113 of two adjacent battery cells 110 can be electrically connected through the bus-bar 130. The bus-bar 130 may be made of an electrically conductive metal, e.g., gold, silver, copper, nickel, aluminum, copper alloy or aluminum alloy, so as to electrically connect between the terminal portions 111. The bus-bar 130 may be bonded to the terminal portion 111 through welding, e.g., laser welding or ultrasonic welding. The shape of the bus-bar 130 may be variously formed according to the shape of the terminal portion 111.

In this embodiment, the case where the battery cell 110 is a prismatic lithium ion secondary battery will be described as an example. However, embodiments are not limited thereto, and may be applied to various types of batteries, e.g., a lithium polymer battery.

Figure 3:
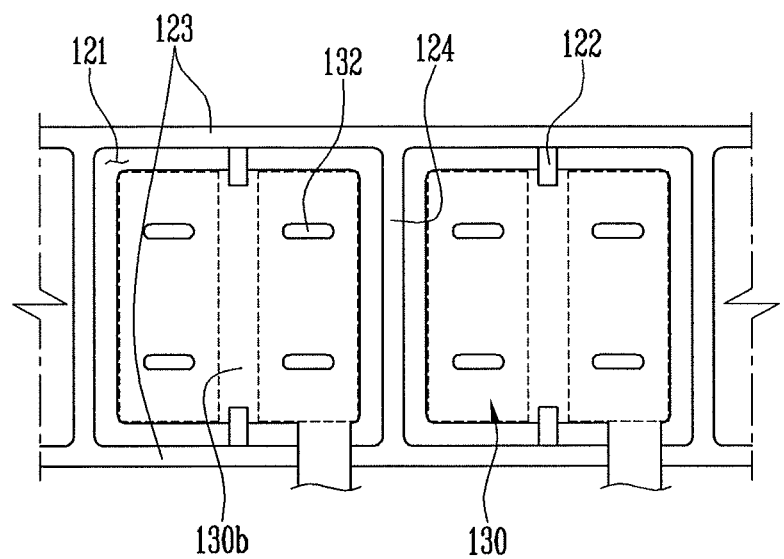
FIG. 3 illustrates a plan view showing portion A of FIG. 1.

FIG. 3 is an enlarged plan view of portion A of FIG. 1. FIG. 4 is an enlarged perspective view of the portion A of FIG. 1.

Referring to FIGS. 3 and 4, the bus-bar 130 is bonded through welding after being mounted in the opening 121 of the bus-bar holder 120. As discussed previously, the guide portion 123 is formed to protrude upward along the circumference of the opening 121 in the direction where the plurality of battery cells 110 is arranged. The fixing member 122 is formed on an inner surface of the guide portion 123 and may have a hook-shape facing downward. The fixing member 122 is formed at a position corresponding to the upper surface of the bus-bar 130.

Here, the bus-bar 130 has the bending portion 130b, of which a middle area is bent to protrude upward, and the fixing member 122 is formed at a position corresponding to the bending portion 130b of the bus-bar 130. The bending portion 130b is used to reinforce the rigidity of the bus-bar 130, and can absorb impact applied to the bus-bar 130. As described above, the hook-shaped fixing member 122 is formed on the inner surface of the guide portion 123, to fix the bending portion 130b of the bus-bar 130. Accordingly, it is possible to improve workability when the bus-bar 130 is welded to the terminal portion 111 of the battery cell 110.

As discussed previously, the bus-bar 130 is spaced apart from the opening 121 of the bus-bar holder 120 at a predetermined interval. That is, the size of the bus-bar 130 is formed smaller than that of the opening 121 of the bus-bar holder 120. Accordingly, when the bus-bar 130 is welded to the terminal portion 111 of the battery cell 110, it is possible to prevent the bus-bar holder 120, which may be made of plastic, from melting. The terminal portion 111 of the battery cell 110 and the welding portion 132 of the bus-bar 130 are positioned adjacent to each other at an edge area of the bus-bar 130. Therefore, the bus-bar 130 and the opening 121 of the bus-bar holder 120 may be spaced apart from each other to an extent where the bus-bar holder 120 is not damaged by heat generated during the welding.

An insulating member 124 is formed between adjacent openings 121 in the bus-bar holder 120. The insulating member 124 may be formed in a plate shape, to prevent a short circuit between adjacent bus-bars 130.

Figure 5:
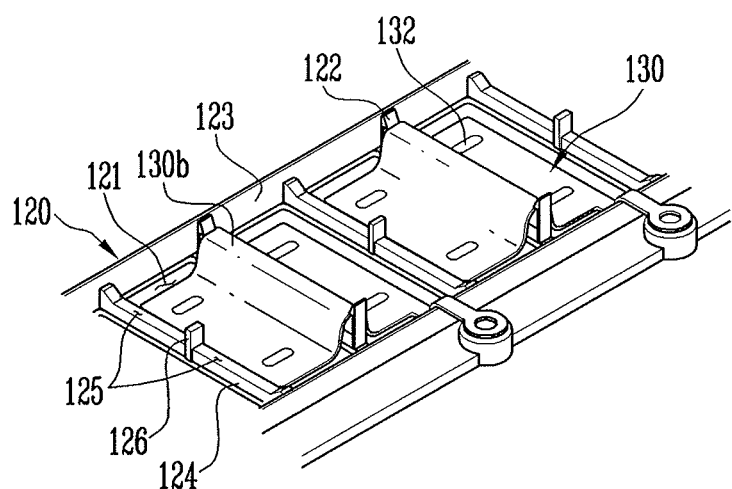
FIG. 5 illustrates a perspective view of a bus-bar welded to a bus-bar holder and a terminal portion of a battery cell in a battery module according to another embodiment.

FIG. 5 is a perspective view showing a state in which the bus-bar 130 is welded to the bus-bar holder 120 and the terminal portion 111 of the battery cell 110 in the battery module 100 according to another embodiment.

Hereinafter, the insulating member 124, a gas exhausting portion 125, and a short circuit preventing member 126 according to this embodiment will be described with reference to FIG. 5. Here, components identical or corresponding to those of the aforementioned embodiment are designated by like reference numerals, and their detailed descriptions will be omitted to avoid redundancy.

Referring to FIG. 5, the bus-bar 130 is spaced apart from the opening 121 of the bus-bar holder 120 at a predetermined interval, and the guide portion 123 is formed to protrude upward along the circumference of the opening 121 in the direction where the plurality of battery cells 110 is arranged. The hook-shaped fixing member 122 is formed on an inner surface of the guide portion 123. The fixing member 122 is formed at a position corresponding to the bending portion 130b of the bus-bar 130.

The plate-shaped insulating member 124 is foamed between adjacent openings 121 in the bus-bar holder 120. Both sides of the insulating member 124 may be connected to the facing guide portions 123. In addition, the insulating member 124 may include the gas exhausting portion 125, in which a height of one area is formed low. For example, as illustrated in FIG. 5, edges of the insulating member 124 may be higher than a center portion thereof, thereby defining the exhausting portion 125. Here, the gas exhausting portion 125 is formed higher than the upper surface of the bus-bar 130. Accordingly, it is possible to prevent the occurrence of a short circuit between the bus-bars 130.

When the bus-bar 130 is welded to the terminal portion 111 of the battery cell 110, a vacuum atmosphere is formed using a shield gas, e.g., nitrogen or argon. In this case, if the shield gas is not exhausted but left at the welding portion 132, the external appearance of the welding bead may be damaged when the bus-bar holder 120 is melted by welding heat. Accordingly, the gas exhausting portion 125 having a low height is formed in one area of the insulating member 124, so that the shield gas can be more easily exhausted through the gas exhausting portion 125 during the welding.

The short circuit preventing member 126 is formed to protrude upward in one area of the gas exhausting portion 125. For example, the short circuit preventing member 126 may be formed to protrude in a middle area of the gas exhausting portion 125, and accordingly, it is possible to prevent the occurrence of a short circuit between the bus-bars 130.

Figure 6:
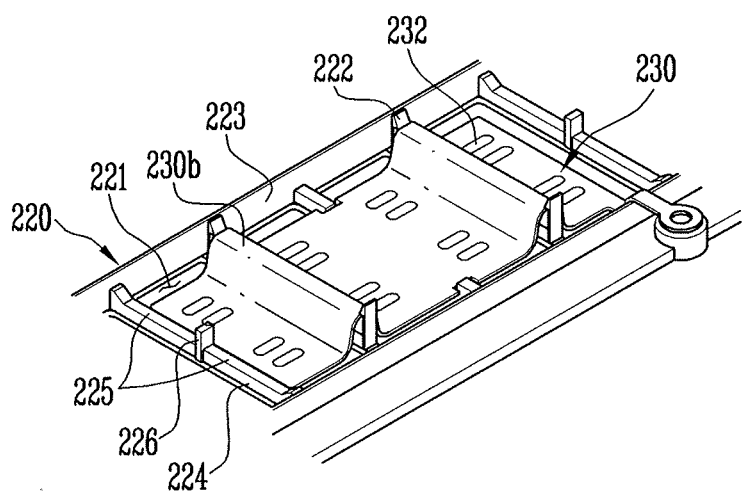
FIG. 6 illustrates a perspective view of a bus-bar welded to a bus-bar holder and a terminal portion of a battery cell in a battery module according to still another embodiment.
Figure 7:
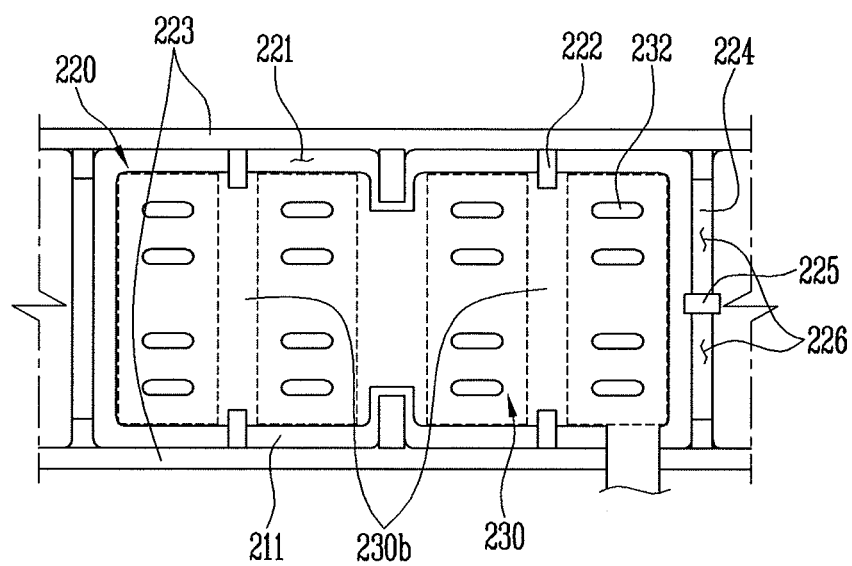
FIG. 7 illustrates a plan view of FIG. 6.

FIG. 6 is a perspective view showing a state in which a bus-bar is welded to a bus-bar holder and a terminal portion of a battery cell in a battery module according to still another embodiment. FIG. 7 is a plan view of FIG. 6.

Here, components identical or corresponding to those of the aforementioned embodiment are designated by like reference numerals, and their detailed descriptions will be omitted to avoid redundancy.

Referring to FIGS. 6 and 7, when a plurality of battery cells are variously connected in series/parallel, a bus-bar 230 may be formed to be positioned on terminal portions 211 of four battery cells. In this case, one opening 221 formed in a bus-bar holder 220 is formed so that the terminal portions 211 of the four battery cells are exposed therethrough, and the bus-bar 230 has two bending portions 230b formed to reinforce the rigidity thereof.

A guide portion 223 is formed to protrude upward along the circumference of the opening 221 in the direction where the plurality of battery cells is arranged, and a hook-shaped fixing member 222 is formed on an inner surface of the guide portion 223. The fixing member 222 is formed at a position corresponding to an upper surface of a bending portion 230b of the bus-bar 230.

A plate-shaped insulating member 224 is formed between adjacent openings 221 of the bus-bar holder 220. Here, both sides of the insulating member 224 are connected to the guide portion 223. The insulating member 224 includes a gas exhausting portion 225 in which the height of one area is formed low, and a short circuit preventing member 226 is formed to protrude upward in one area of the gas exhausting portion 225.

The bus-bar 230 is formed to be spaced apart from the opening 221 of the bus-bar holder 220 at a predetermined interval. Accordingly, the bus-bar holder 220 made of a plastic compound material may be less influenced by welding heat.

According to embodiments, a battery module includes a fixing member on a guide portion of a bus-bar holder, so that the bus-bar can be easily fixed, thereby improving workability during welding of the bus-bar. Further, the bus-bar is spaced apart from a circumference of the opening of the bus-bar holder at a predetermined interval, so that it is possible to prevent the bus-bar holder from being damaged by heat and to improve the external appearance of a welding bead. Furthermore, a gas exhausting portion is formed in the bus-bar holder, so that a shield gas can be smoothly exhausted therethrough when the bus-bar is welded to the terminal portion of the battery cell Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells arranged in a first direction, each one of the plurality of battery cells having a terminal portion on an upper surface thereof;
a bus-bar holder positioned on the plurality of battery cells, the bus-bar holder having an opening exposing terminal portions of the plurality of battery cells;
a bus-bar including a bending portion protruding upward and a flat portion contacting the terminal portions of the plurality of battery cells, the bus-bar positioned in the opening of the bus-bar holder, the bus-bar being spaced apart from a circumference of the opening of the bus-bar holder by a predetermined interval, and the bus-bar electrically connecting terminal portions of adjacent battery cells among the plurality of battery cells;
a guide wall extending along the opening in the first direction, the guide wall extending upward above the opening; and
a fixing member on an inner side of the guide wall, the fixing member being at the bending portion of the bus-bar and pressing the bending portion toward the terminal portions of the plurality of battery cells; and
an insulating member between adjacent flat portions of adjacent bus-bars, wherein
the insulating member includes a gas exhausting portion, a height of the gas exhausting portion being lower than that of another area of the insulating member, the gas exhausting portion being between bending portions of the adjacent bus-bars and extending to parallel the bending portions of the adjacent bus-bars.

2. The battery module as claimed in claim 1, wherein a portion of the fixing member overhangs an edge of the bending portion of the bus-bar.

3. The battery module as claimed in claim 1, wherein the fixing member has a shape of a hook.

4. The battery module as claimed in claim 1, wherein the guide wall is continuous along the first direction.

5. The battery module as claimed in claim 1, wherein the insulating member is in a plate shape.

6. The battery module as claimed in claim 5, further comprising a short circuit preventing member protruding upward in one area of the gas exhausting portion, wherein a height of the short circuit preventing member is higher than that of the gas exhausting portion.

7. The battery module as claimed in claim 5, wherein the gas exhausting portion is higher than a portion of the bus-bar adjacent to the gas exhausting portion.

8. The battery module as claimed in claim 1, wherein the bus-bar holder includes a plastic compound material.

9. The battery module as claimed in claim 1, wherein the terminal portion of each one of the battery cells and the bus-bar are bonded to each other by welding through a welding hole.

10. The battery module as claimed in claim 1, wherein a portion of the opening separates the bus-bar from the bus-bar holder, the portion of the opening being an empty space.

11. A method of manufacturing a battery module, the method comprising:
arranging a plurality of battery cells in a first direction, each one of the plurality of battery cells having a terminal portion on an upper surface thereof;
forming a bus-bar holder on the plurality of battery cells, the bus-bar holder having an opening exposing terminal portions of the plurality of battery cells;
forming a bus-bar including a bending portion protruding upward, the bus-bar in the opening of the bus-bar holder, the bus-bar being spaced apart from a circumference of the opening of the bus-bar holder by a predetermined interval, and the bus-bar electrically connecting terminal portions of adjacent battery cells among the plurality of battery cells;
forming a guide wall extending along the opening in the first direction, the guide wall extending upward above the opening;
forming a fixing member on an inner side of the guide wall, the fixing member being at the bending portion of the bus-bar and pressing the bending portion toward the terminal portions of the plurality of battery cells; and forming an insulating member between adjacent flat portions of adjacent bus-bars, wherein
the insulating member includes a gas exhausting portion, a height of the gas exhausting portion being lower than that of another area of the insulating member, the gas exhausting portion being between bending portions of the adjacent bus-bars and extending to parallel the bending portions of the adjacent bus-bars.

12. The method as claimed in claim 11, wherein the terminal portion of each one of the battery cells and the bus-bar are bonded to each other through welding.

13. The method as claimed in claim 12, wherein the terminal portion of each one of the battery cells and the bus-bar are bonded to each other through laser welding or ultrasonic welding.

14. The battery module as claimed in claim 1, wherein the height of the lower portion of the insulating member is lower than the height of the guide wall.

15. The battery module as claimed in claim 1, wherein the insulating member includes side walls facing the adjacent flat portions of the adjacent bus-bars and an upper side including a recess recessed toward the battery cells.

16. The battery module as claimed in claim 1, wherein the fixing member protrudes beyond the guide wall.

* * * * *